United States Patent [19]
Zboralski et al.

[11] 3,983,973
[45] Oct. 5, 1976

[54] VIBRATION DAMPER FOR A BRAKE DISK

[75] Inventors: Dietrich Zboralski; Hans Gebhardt, both of Munich, Germany

[73] Assignee: Knorr-Bremse GmbH, Munich, Germany

[22] Filed: May 2, 1975

[21] Appl. No.: 573,889

[30] Foreign Application Priority Data
May 25, 1974 Germany............................ 2425438

[52] U.S. Cl. ............................ 188/218 A; 188/1 B; 188/264 A
[51] Int. Cl.² ........................................ F16D 65/12
[58] Field of Search ..... 188/218 XL, 218 A, 264 A, 188/264 AA, 73.1, 73.2, 1 B; 192/107 R; 74/573, 574

[56] References Cited
UNITED STATES PATENTS

| | | | |
|---|---|---|---|
| 2,129,178 | 9/1938 | Jordan | 188/218 A |
| 2,243,334 | 5/1941 | Eksergian | 188/218 XL |
| 3,298,476 | 1/1967 | Day | 188/218 A |
| 3,425,523 | 2/1969 | Robinette | 188/218 A |
| 3,430,741 | 3/1969 | Meredith | 188/218 XL |
| 3,509,973 | 5/1970 | Kimata | 188/218 A |
| 3,575,270 | 4/1971 | Wagenfuhrer et al. | 188/218 A |
| 3,687,244 | 8/1972 | Hillegass et al. | 188/218 A |

FOREIGN PATENTS OR APPLICATIONS

| | | | |
|---|---|---|---|
| 1,114,296 | 5/1968 | United Kingdom | 188/218 A |
| 1,230,274 | 4/1971 | United Kingdom | 188/218 A |
| 1,197,669 | 7/1970 | United Kingdom | 188/218 XL |

*Primary Examiner*—Trygve M. Blix
*Assistant Examiner*—Edward R. Kazenske
*Attorney, Agent, or Firm*—Edmund M. Jaskiewicz

[57] ABSTRACT

A brake disk comprising a pair of spaced friction disks against which a brake lining on a brake shoe can be applied to produce a braking effect are interconnected by a plurality of ribs and guide vanes so as to define ventilation passages between the friction disks. Strips of vibration damping material are positioned in radial grooves formed in the mutually facing surfaces of the friction disks. The inserts comprise a metal which damps vibrations and has a coefficient of expansion greater than that of the iron material from which the friction disks are formed and may comprise such metals as lead, bronze or copper.

7 Claims, 3 Drawing Figures

U.S. Patent  Oct. 5, 1976  3,983,973
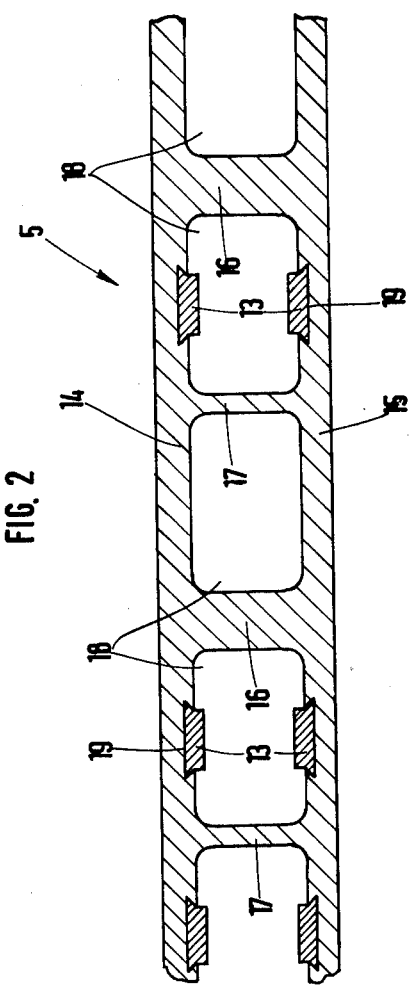
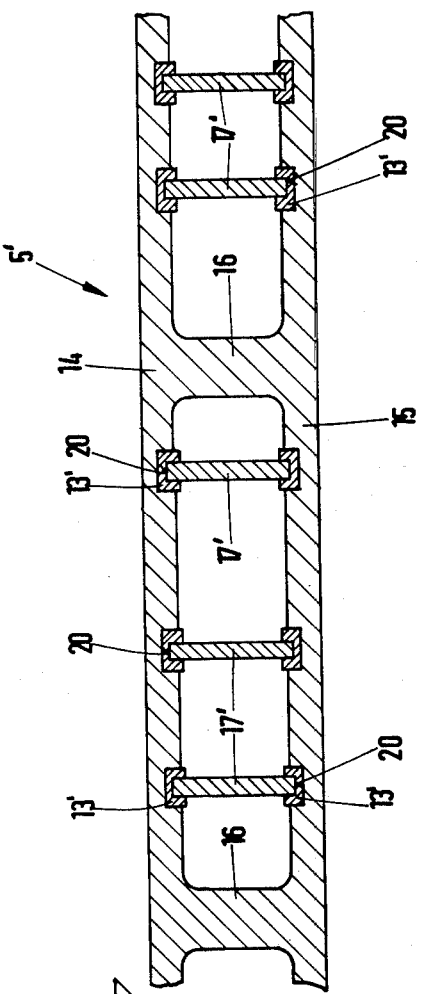
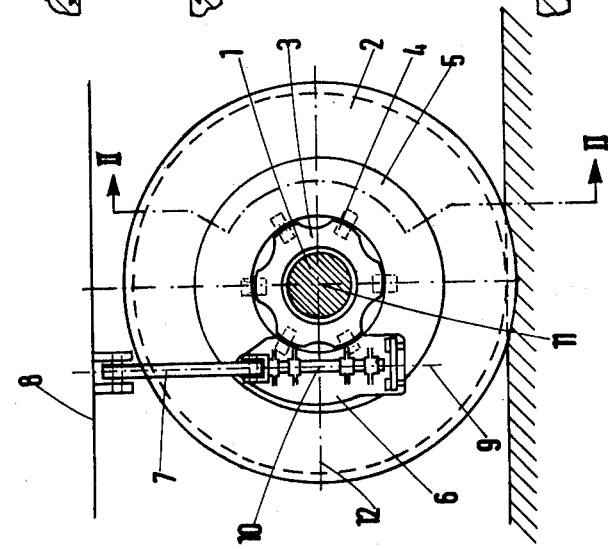

VIBRATION DAMPER FOR A BRAKE DISK

The present invention relates to a brake disk for a disk brake on a railway vehicle, more particularly, to the structure of the friction disks in order to eliminate noises produced by the application of the brake linings against the friction disks.

A disk brake such as employed on railway and other vehicles essentially comprises a brake disk formed by two friction disks that are interconnected by ventilation ribs and guide vanes so as to form ventilation passages between the friction disks. Brake shoes provided with brake linings are suspended by a suitable rigging so as to be actuated to press the brake lining against the brake disk to produce the braking effect.

During the braking of railway vehicles equipped with disk brakes there is very frequently produced a very unpleasant squealing noise. It is believed that this noise is produced by vibrations induced in the brake disk under the action of the friction forces generated by the brake linings. Since all newer railway vehicles are generally equipped with disk brakes and since the density of rail traffic has been increasing, the squealing noises produced by braking are more frequently produced and are becoming more disturbing to the environment of rail operations. In addition, such braking noises adversely affect the comfort of passengers riding in railway vehicles. In view of the discomfort to passengers and to the increasing emphasis placed on the control of noise pollution it has become desirable to eliminate such squealing noises as produced during braking.

In the disk brakes of the type referred to above the brake disk has been generally made by casting from an iron material.

The shape of the casting is somewhat similar to that of a fan having radial flow passages therethrough in which the outer surfaces of the fan blades in the form of annular disks are provided with the friction surface against which the brake linings are urged. The brake disk casting essentially comprises a pair of annular friction disks which are interconnected and mounted upon a steel hub through a plurality of uniformly spaced radial arms which are shaped as ventilation ribs in the area of the friction disks or the ends of the radial arms are formed as such ribs. The friction disks are interconnected through a plurality of guide vanes which are similarly uniformly spaced and generally have a shorter radial length than the ventilation ribs. It is further believed that the regular and uniform spacing of the blades produces a distinct natural frequency of the brake disks which in turn may assist in producing the objectionable squealing noises when the friction disks are subjected to a low force contact with the brake linings.

It is therefore the principal object of the present invention to provide a novel and improved brake disk which substantially eliminates squealing noises produced during braking.

It is another object of the present invention to provide such a brake disk wherein squealing noises which may be produced by vibrations induced in the friction disks are significantly damped or even completely eliminated during braking.

According to one aspect of the present invention the brake disk for a disk brake on a railway vehicle comprises a pair of spaced friction disks against which a brake lining on a brake shoe can be applied to produce a braking effect. The spaced friction disks are interconnected by a plurality of ribs and guide vanes which form ventilation passageways between the friction disks. A plurality of inserts of vibration damping material are positioned in radial grooves formed on the mutually facing surfaces of the friction disks. Because of the structure of the vibration damping material inserted in the radial grooves, the natural vibrations of the brake disk are damped by the inserts which absorb the energy of vibration. As a result, those properties and chaacteristics of the brake disk which tend to produce a natural resonant frequency of the brake disk are reduced. At the same time, the natural frequency of the brake disk can be shifted into ranges which would not be so noticable nor distrubing to persons in the vicinity of the vehicle.

Other objects and advantages of the present invention will be apparent upon reference to the accompanying description when taken in conjunction with the following drawings, which are exemplary, wherein:

FIG. 1 is a side elevational view of a disk brake mounted on an axle-wheel assembly of a railway vehicle;

FIG. 2 is a sectional view taken along the line II—II of FIG. 1 in enlarged scale; and FIG. 3 is a view similar to that of FIG. 2 but showing a modification thereof.

Proceeding next to the drawings wherein like reference symbols indicate the same parts throughout the various views a specific embodiment and modification of the present invention will be described in detail.

As may be seen in FIG. 1, an axle 1 upon one end of which is mounted a flanged railway wheel 2 for a railway vehicle has securely mounted thereon a hub 3. A plurality of radially extending arms 4 connect an annular brake ring 5 to the hub 3. The brake ring 5 has friction or braking surfaces on its outer faces thereof and is generally shaped as a fan wheel. The brake ring 5 together with the hub 3 forms the brake disk 3,5. A pair of brake shoes 6 each having a brake lining thereon that is not shown in the drawing can be pressed onto both sides of the brake ring 5 by means of a brake actuating structure which is also not shown in the drawings but known in the art. The brake shoe 6 is supported on a portion of the vehicle frame 8 by means of a pendulum 7 pivotally mounted from the frame 8 and functioning as a supporting device. The longitudinal direction and thus the supporting direction of the pendulum 7 is indicated at 9 and is disposed perpendicular to a straight line 12 passing through the rotary axis 11 of brake disk 3,5 and a resultant force application point 10 on the brake linings with respect to the brake disk 3,5. In order to maintain this relationship it is necessary that there is no vertical displacement of the vehicle frame 8 with respect to the axle 1. The frame component 8 thus preferably comprises an uncushioned or unsuspended element of the vehicle. As a result of this structure, during braking the brake shoe 6 is subjected only to a tangential force with respect to the brake disk 3,5 but is not subjected to a component of radial force. Accordingly, this reduces one of the forces that induces vibrations in the brake disk 3,5 which in turn is a cause of the undesirable squealing noises.

In order to prevent the squealing braking noises by reducing the induced vibrations in the brake disk it is preferable to employ brake linings which are characterized by not having any local or spot variations in friction value when urged against the brake disk during the braking operation. In particular, it is desired to avoid local and brief increases in friction value that subside rapidly. According to the present invention brake linings are employed which at a given total friction value have the same friction value at each point on the lining without any local or spot increases in friction value. The elimination of such sharp and abrupt fluctuations in friction values on various points of the brake lining eliminates a further source of generating squealing noises during braking.

In order to damp any vibrations that may possibly occur in spite of a properly selected brake lining, the brake ring 5 is provided with a plurality of inserts 13 which distort its own natural resonant frequency and absorb vibration energy. As can be seen in FIG. 2, the brake ring 5 comprises two annular friction disks 14 and 15 that are connected to each other by means of radial ventilation ribs 16. Guide vanes 17 are arranged between the ventilation ribs 16 and similarly interconnect the friction disks 14 and 15. The guide vanes 17 generally have a shorter radial length and are lighter in structure than the ventilation ribs 16.

In the embodiment of FIG. 2, the friction disks 14 and 15 as well as ventilation ribs 16 and guide vanes 17 are cast in a single integral unit from an iron material, preferably gray cast iron.

The friction disks 14 and 15 as well as the ventilation ribs 16 and guide vanes 17 define a plurality of ventilation passages 18. A plurality of radially extending grooves 19 having dovetail cross sections are formed in the mutually directed faces of the friction disks 14 and 15 in the area of the ventilation passages 18. A band or strip-shaped insert 13 is positioned or pressed into each of the grooves 19. The inserts 13 extend radially throughout the entire annular width of the friction disks 14 and 15.

The inserts 13 are made of a material that suitably damps vibrations, is heat-proof and has a greater coefficient of thermal expansion than the iron material from which the friction disks 14 and 15 are made. Alloys having these characteristics may be used and the inserts may be formed of lead, bronze or copper. Since the brake disks are subjected to high temperatures ranging up to 400°C. during the braking operation it is appreciated that the inserts must be made of a material capable of withstanding these temperatures.

Because the inserts 13 have a greater coefficient of thermal expansion than the friction disk and because the inserts are positioned in dove-tailed grooves 19 the inserts 13 upon becoming heated during braking will expand to a greater extent than the grooves 19 retaining the inserts which thus functions to improve the holding of the inserts in the grooves.

When vibrations occur on or in brake disk 5, the inserts 13 will damp the vibratory movements because of their frictional contact with the friction disks 14 and 15 and through minute movements in themselves with respect to the friction disks 14 and 15 to absorb vibration energy.

It is apparent from FIG. 2 that friction disks 14 and 15 are not provided with inserts 13 in the area of every ventilation passage 18. This is deliberate and produces an irregular or non-uniform distribution of the inserts 13 with respect to the periphery of the brake disk 5. This has the effect of distorting and changing the natural frequency of the brake disk 5 which further reduces the squealing noises produced during braking.

Any imbalance resulting from such a non-uniform distribution of inserts 13 on the brake disk 5 must be compensated for by means of a suitable differential structure paticularly of the guide vanes 17 and by possibly the use of suitable counter weights. Such compensatory structures and counter weights are not shown in the drawings but are known in the art.

In FIG. 3 there is shown a modification wherein guide vanes 17' are fabricated as separate components for brake disk 5' and are inserted into radial grooves 20 formed on mutually facing surfaces on two opposed inserts 13' on friction disks 14 and 15. Such guide vanes 17' may also be non-uniformly arranged between the two ventilation ribs 16. The remaining structure of brake disk 5' corresponds to the structure illustrated in FIG. 2.

Positioning of guide vanes 17' in inserts 13' produces an intensified absorbtion of energy through the inserts when the brake disk vibrates during braking. Such micromovements accompanying the vibrations are multiplied and increased through the guide vanes 17' on the inserts 13'. A dove-tail retaining structure for inserts 13' and friction disks 14 and 15 may be omitted since opposed inserts 13' are reciprocally supported by the guide vanes 17' extending therebetween.

The brake disk can be so manufactured that the ventilation ribs are integral with both friction disks of the brake disk and also the guide vanes retained by the inserts. In order to suppress or diminish a distinct natural frequency such components as the ventilation ribs and guide vanes may be non-uniformly distributed with respect to the periphery of the brake disk.

Thus it can be seen that the present invention has provided a brake disk which significantly reduces and virtually eliminates squealing noises produced during braking by the action of the brake lining on the friction surfaces of the brake disk. Further, the inserts utilized to absorb such vibration energy are securely retained within the friction disks by a dove-tail arrangement or by guide vanes positioned between opposed inserts. The disclosed structure thus provides an economical and simple solution of a vexing problem in the operation of railway vehicles equipped with disk brakes.

It will be understood that this invention is susceptible to modification in order to adapt it to different usages and conditions, and accordingly, it is desired to comprehend such modifications within this invention as may fall within the scope of appended claims.

What is claimed is:

1. A brake disk for a disk brake on a railway vehicle comprising a pair of spaced friction disks against which a brake lining on a brake shoe can be applied to produce a braking effect, a plurality of ribs and guide means interconnecting said spaced friction disks to define ventilation passages therebetween, there being radial grooves on the mutually facing surfaces of said friction disks, and a pair of oppositely facing inserts of vibration damping material having grooves on the faces thereof directed toward each other in said radial grooves, and said guide means including guide vanes interconnecting said inserts received within said grooves.

2. A brake disk as claimed in claim 1 wherein said friction disks comprise an iron material, said inserts comprise a metal which damps vibrations and has a coefficient of expansion greater than that of said iron material.

3. A brake disk as claimed in claim 2 wherein said inserts comprise one of lead, bronze or copper.

4. A brake disk as claimed in claim 1 wherein said inserts are non-uniformly distributed with respect to the periphery of the brake disk.

5. A brake disk as claimed in claim 1 wherein said friction disks and said ventilation ribs are integral.

6. A brake disk as claimed in claim 1 wherein said guide vanes are non-uniformly distributed with respect to the circumference of the brake disk.

7. A brake disk as claimed in claim 1 and means for supporting said brake shoe in a direction perpendicular to a straight line passing through a rotary axis of the brake disk and a resultant force application point on the brake lining.

* * * * *